(12) United States Patent
Mendenhall (10) Patent No.: US 7,352,836 B1
(45) Date of Patent: Apr. 1, 2008

(54) SYSTEM AND METHOD OF CROSS-CLOCK DOMAIN RATE MATCHING

(75) Inventor: Todd Mendenhall, San Jose, CA (US)

(73) Assignee: Nortel Networks Limited, St. Laurent, Quebec (CA)

(*) Notice: Subject to any disclaimer, the term of this patent is extended or adjusted under 35 U.S.C. 154(b) by 681 days.

(21) Appl. No.: 10/172,547

(22) Filed: Jun. 14, 2002

Related U.S. Application Data (60) Provisional application No. 60/314,146, filed on Aug. 22, 2001.

(51) Int. Cl.
*H04L 7/00* (2006.01)

(52) U.S. Cl. .................. 375/372; 370/304; 375/354; 714/11; 714/12

(58) Field of Classification Search ............... 375/372, 375/354; 370/352, 252, 335; 714/3, 7, 11, 714/12
See application file for complete search history.

(56) References Cited

U.S. PATENT DOCUMENTS

| | | | | |
|---|---|---|---|---|
| 4,181,974 A | * | 1/1980 | Lemay et al. ............... | 709/225 |
| 5,256,912 A | * | 10/1993 | Rios ........................... | 327/144 |
| 5,884,100 A | * | 3/1999 | Normoyle et al. ............ | 710/52 |
| 6,055,285 A | * | 4/2000 | Alston ........................ | 375/372 |
| 6,098,139 A | * | 8/2000 | Giacobbe et al. ............. | 710/58 |
| 6,359,479 B1 | | 3/2002 | Oprescu | |
| 6,493,818 B2 | | 12/2002 | Robertson | |

* cited by examiner

Primary Examiner—David C. Payne
Assistant Examiner—Adolf DSouza
(74) Attorney, Agent, or Firm—Guerin & Rodriguez, LLP; Michael Rodriguez (57) ABSTRACT

Described are a system and method for providing an interface to synchronize data transfers across clock domains. A first pulse converter receives a request signal in a first clock domain and converts the request signal into a synchronization signal in a second clock domain. A second pulse converter receives the synchronization signal in the second clock domain from the first pulse converter and converts the synchronization signal into an acknowledgment signal in the first clock domain. The pulse converters cooperate thus to perform a self-acknowledging handshake that synchronizes writes and reads to and from a FIFO memory, thereby effectuating the transfer of data across two clock domains.

20 Claims, 8 Drawing Sheets

SYSTEM AND METHOD OF CROSS-CLOCK DOMAIN RATE MATCHING

RELATED APPLICATION

This application claims the benefit of the filing date of co-pending U.S. Provisional Application Ser. No. 60/314,146, filed Aug. 22, 2001, entitled "Rate Matching Synchronization FIFO Controller Specification," the entirety of which provisional application is incorporated by reference herein.

FIELD OF THE INVENTION

The invention relates generally to electronic circuits. More particularly, the invention relates to a system and method for synchronizing operations across two different clock domains in an electronic circuit.

BACKGROUND

Transferring data, commands, or other information between circuits in an electrical device can require some form of synchronization. Typically, a clock signal achieves this synchronization by triggering the operation of various elements in the circuits, such as flip-flops, registers, and latches. Synchronization can occur by operating the circuit elements of each circuit on the same clock signal or by providing clocking signals along with data when passing the data between the circuits.

In some applications, two circuits within an electrical device operate in different clock domains. In one clock domain, a first clock signal triggers the operation of the elements of a first circuit. In a second clock domain, a second separate clock signal triggers the operation of components of a second circuit. Coordinating data transfers between circuits operating in different clock domains becomes problematic where the two clock signals have different frequencies (i.e. different clock speeds). Even if the two clock signals have the same clock speed, a difference in phase relationship between the two clock signals can cause failures in the data passing across clock domains.

SUMMARY

In brief, the present invention synchronizes data transfers across clock domains independently of the operating clock frequencies of the clock domains and matches bit rates across the clock domains without incurring a reduction of bandwidth experienced by traditional clock domain interfaces. The invention also provides an interface that uses certain types of timing signals commonly associated with interfaces between clock domains and accurately maintains the level of data items stored in a first-in first-out (FIFO) memory to prevent "overrunning" and "underrunning" of the FIFO memory.

In one aspect, the invention relates to an interface for synchronizing data transfers across clock domains. The interface includes a first pulse converter that receives a request signal in a first clock domain and converts the request signal into a synchronization signal in a second clock domain. A second pulse converter receives the synchronization signal in the second clock domain from the first pulse converter and converts the synchronization signal into an acknowledgment signal in the first clock domain.

Each pulse converter includes at least one circuit operating at a first clock speed in the first clock domain and at least one circuit operating at a second clock speed in the second clock domain. The first clock domain is a write clock domain and the second clock domain is a read clock domain, or the first clock domain is a read clock domain and the second clock domain is a write clock domain. In one embodiment, the interface includes a register in each clock domain. Each register maintains a count of a number of data items stored in a memory.

In another aspect, the invention relates to a controller for synchronizing transfers of data items across clock domains. The controller includes a first control module in a first clock domain and a second control module in a second clock domain. A plurality of synchronizers are in electrical communication between the first and second clock domains to receive a request signal from one of the first and second control modules, to provide a synchronization signal to the other of the first and second control modules in response to a received request signal, and to provide to that one of the first and second control modules from which the request signal is received an acknowledgment signal generated from the synchronization signal. Each control module can include a register for maintaining a count of a number of data items stored in the memory.

In one embodiment, at least one of the plurality of synchronizers provides a synchronization signal to the first control module in the first clock domain and one of the plurality of synchronizers provides synchronization signals to the second control module in the second clock domain. In other embodiments, a plurality of synchronizers provide a synchronization signal to the first control module in the first clock domain, a plurality of synchronizers provide a synchronization signal to the second control module in the second clock domain, or a plurality of synchronizers provide a synchronization signal to the first control module in the first clock domain, a plurality of synchronizers provide a synchronization signal to the second control module in the second clock domain.

In another aspect, the invention relates to a method of synchronizing data transfers between a source and a destination clock domain. The number of data items stored in memory is changed. A request signal propagates from the source clock domain to the destination clock domain to indicate the change in the number of data items stored by the memory. The request signal issued to the destination clock domain is converted into an acknowledgment signal. The acknowledgment signal propagates to the source clock domain to indicate that the destination clock domain received the request signal.

Each clock domain maintains a count of the number of data items stored in the memory. The source clock domain operates at a different clock frequency than the destination clock domain. The destination clock domain updates the count of the number of data items stored in memory in response to receiving the request signal.

In one embodiment, a data item is read in the source clock domain from the memory interface and written to the memory interface in the destination clock domain. In another embodiment, a data item is written in the source clock domain to the memory interface and read from the memory interface in the destination clock domain.

In one embodiment, the request signal is a first request signal. A second request signal propagates from the source clock domain to the destination clock domain before the source clock domain receives the acknowledgment signal in response to the first request signal. In another embodiment, a second request signal propagates from the destination clock domain to the source clock domain while the first request signal propagates from the source domain to the destination domain. Further, a third request signal can propagate from the destination clock domain to the source clock domain before the destination clock domain receives an acknowledgment signal in response to the second request signal.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
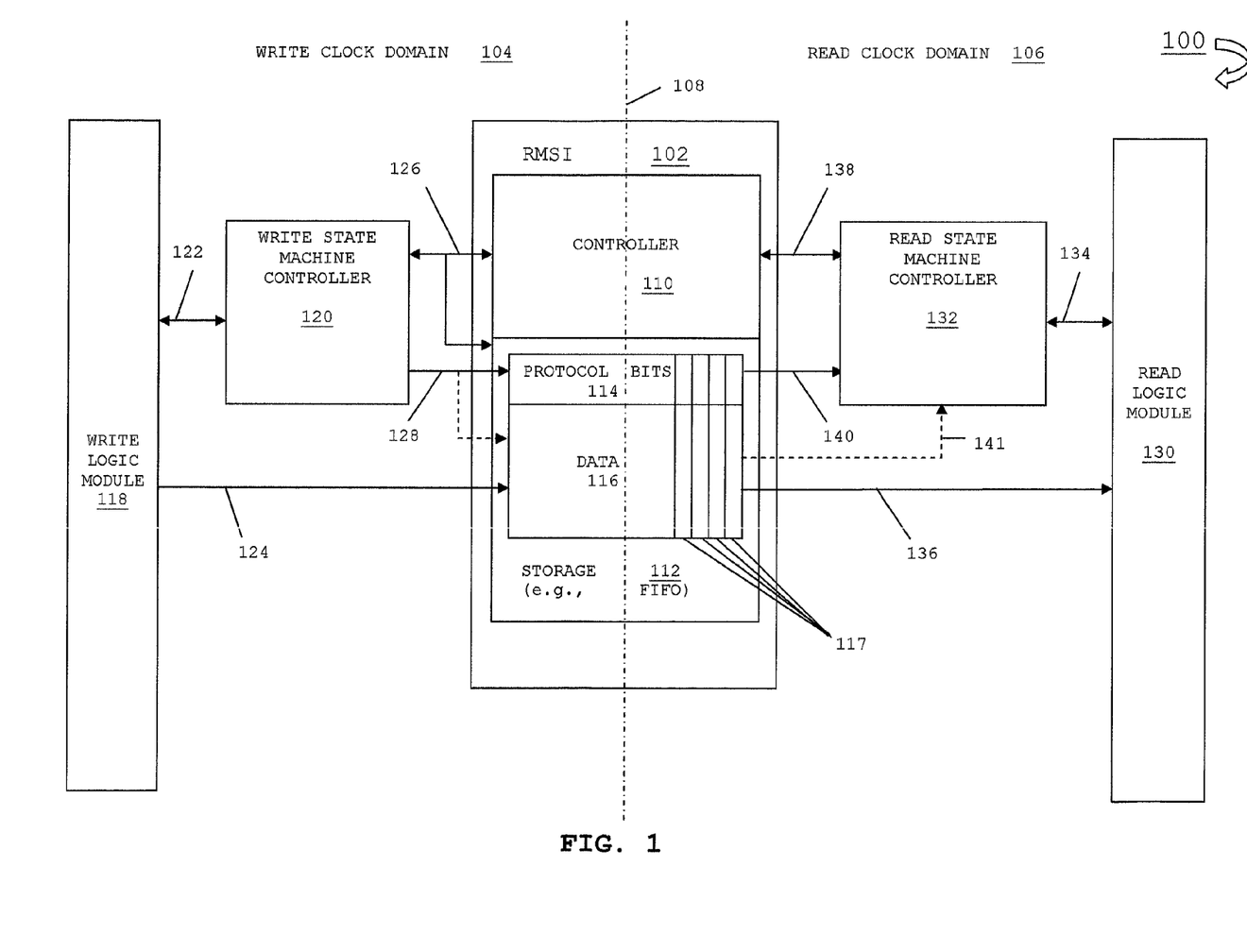
FIG. 1 is a block diagram illustrating an embodiment of a rate matching synchronization system constructed in accordance with the principles of the invention.

FIG. 1 shows an embodiment of a rate matching synchronization system 100 including a rate matching synchronization interface (RMSI) 102 that interfaces between a first clock domain 104 and a second clock domain 106. The clock domains 104, 106 are each in communication with a different clock source (not shown) that generates a steady stream of timing pulses (i.e., clock signals). A dashed line 108 denotes an operational boundary in the rate matching synchronization system 100 between the first and second clock domains 104, 106. Components of the rate matching synchronization system 100 that are in the first clock domain 104 operate according to the clock signal frequency (or clock speed) of the first clock domain 104; components in the second clock domain operate according to the clock signal frequency of the second clock domain 106. The clock speed of the first clock domain 104 can be faster, slower, or the same as the clock speed of the second clock domain 106.

As denoted by the dashed line 108 through the rate matching synchronization interface 102, a first portion of the rate matching synchronization interface 102 is in the first clock domain 104 and a second portion of the rate matching synchronization interface 102 is in the second clock domain 106.

The rate matching synchronization interface 102 includes a controller 110 and storage 112. The controller 110 includes circuitry for implementing a handshaking protocol for synchronizing write and read operations across the clock domain boundary 108, as described in more detail below. In one embodiment, the storage 112 is implemented as a first-in-first-out (FIFO) memory (hereafter referred to as FIFO memory 112). The FIFO memory 112 is used to store temporarily the information (e.g., data and protocol control bits) being transferred from the first clock domain 104 to the second clock domain 106. In one embodiment, the FIFO memory 112 includes memory 114 for storing protocol control bits and memory 116 for storing data.

Data items 117 are stored (written) into the FIFO memory 112 at the clock speed employed in the first clock domain 104 and read from the FIFO memory 112 at the clock speed of the second clock domain 106. In one embodiment, each data item 117 includes one or more protocol control bits and data. Each data item 117 has a fixed width (e.g., one byte). When there are no data items 117 or no data items 117 with valid data in the FIFO memory 112, the FIFO memory 112 is deemed empty. When the FIFO memory 112 has no available memory locations to receive a new data item 117 because all locations contain valid data, the FIFO memory 112 is deemed full.

As a naming convention used in this detailed description, the clock domain that writes to the FIFO memory 112, (i.e., the first clock domain 104), is hereafter referred to as the write clock domain 104, and the clock domain that reads from the FIFO memory 112, (i.e., the second clock domain 106), is hereafter referred to as the read clock domain 106. Also, in general, the term "write" precedes the names of those components in the write clock domain 104, and the term "read" precedes the names of those components in the read clock domain 106.

In the write clock domain 104, a write logic module 118 is in electrical communication with a write state machine controller 120 over signal line 122. The write logic module 118 is also in electrical communication with the data memory 116 of the FIFO memory 112 over data line 124. An example of the write logic module 118 is a register.

The write state machine controller 120 is in electrical communication with the controller 110 of the rate matching synchronization interface 102 over control line 126 and with the protocol control bits memory 114 of the FIFO memory 112 over data line 128. In one embodiment, the write state machine controller 120 can be in electrical communication with the data memory 116 over data line 128 (dashed line).

In the read clock domain 106, a read logic module 130 is in electrical communication with a read state machine controller 132 over control line 134. The read logic module 130 is also in electrical communication with the data memory 116 of the FIFO memory 112 over data line 136. An example of the read logic module 130 is a register.

The read state machine controller 132 is in electrical communication with the controller 110 of the rate matching synchronization interface 102 over control line 138 and with the protocol control bits memory 114 of the FIFO memory 112 over data line 140. The read state machine controller 132 can be in electrical communication with the data memory 116 of the FIFO memory 112 over data line 141 (shown by a dashed line).

In one embodiment, the controller 110 and FIFO memory 112 of the rate matching synchronization interface 102, the write and read state machine controllers 120, 132, and the write and read logic modules 118, 130 are implemented together on one integrated circuit (IC) chip, such as an ASIC (application-specific integrated circuit), FPGA (field-programmable gate array), or PLD (programmable logic device). In other embodiments, these components are implemented on a plurality of IC chips in various combinations, for example, the controller 110 in one IC chip, the FIFO memory 112 in another chip, and the state machine controllers 120, 132 and logic modules 118, 130 in a third chip. As another example, the controller 110 and FIFO memory 112 can be implemented on one IC chip, the write state machine controller 120 and write logic module 118 on a second IC chip, and the read state machine controller 132 and read logic module 130 on a third IC chip.

In operation, data transfer through the rate matching synchronization system 100 is unidirectional, from the write clock domain 104 to the read clock domain 106. In brief overview, the write logic module 118 and write state machine controller 120 store data and control information in the FIFO memory 112 when the FIFO memory 112 is not full, and the read logic module 130 and read state machine controller 132 read data and control information from the FIFO memory 112 when the FIFO memory 112 is not empty. In accordance with the principles of the invention, the average bit rate for writing data to the FIFO memory 112 matches the average bit rate for reading data from the FIFO memory 112.

The controller 110 synchronizes the transfer of the data and control information across the clock domains. To achieve the synchronization, the controller 110 maintains two counts of the number of data items 117 stored in the FIFO memory 112, one count in each clock domain 104, 106. The counts increase when the write clock domain 104 adds a data item 117 to the FIFO memory 112 and decrease when the read clock domain 106 removes a data item from the FIFO memory 112. By these counts, the controller 110 can accurately know when the FIFO memory 112 is or is approaching full or empty.

Changes to the counts do not occur concurrently. For example, when the count in the write clock domain 104 changes because a data item 117 has been added to the FIFO memory 112, the count in the read clock domain 106 lags that of the write clock domain 104 until the write clock domain 104 notifies the read clock domain 106 of the change. Similarly, when the read clock domain count changes because a data item 117 has been removed from the FIFO memory 112, the write clock domain count lags that of the read clock domain 104 until the read clock domain 106 notifies the write clock domain 104 of the change. Synchronization entails propagating a signal across clock domains that, in effect, communicates a change in the count of one clock domain so that the lagging count in the other clock domain can be dynamically updated to reflect the change.

To propagate the signal across the clock domains, the controller 110 uses a request/acknowledge handshake protocol. In accordance with the principles of the invention, this handshake protocol accomplishes the synchronization regardless of the clock frequencies of the clock domains 104, 106, that is, the particular frequencies of the clock domains 104, 106 do not affect the manner in which the controller 110 accomplishes the request/acknowledge handshake.

Figure 2:
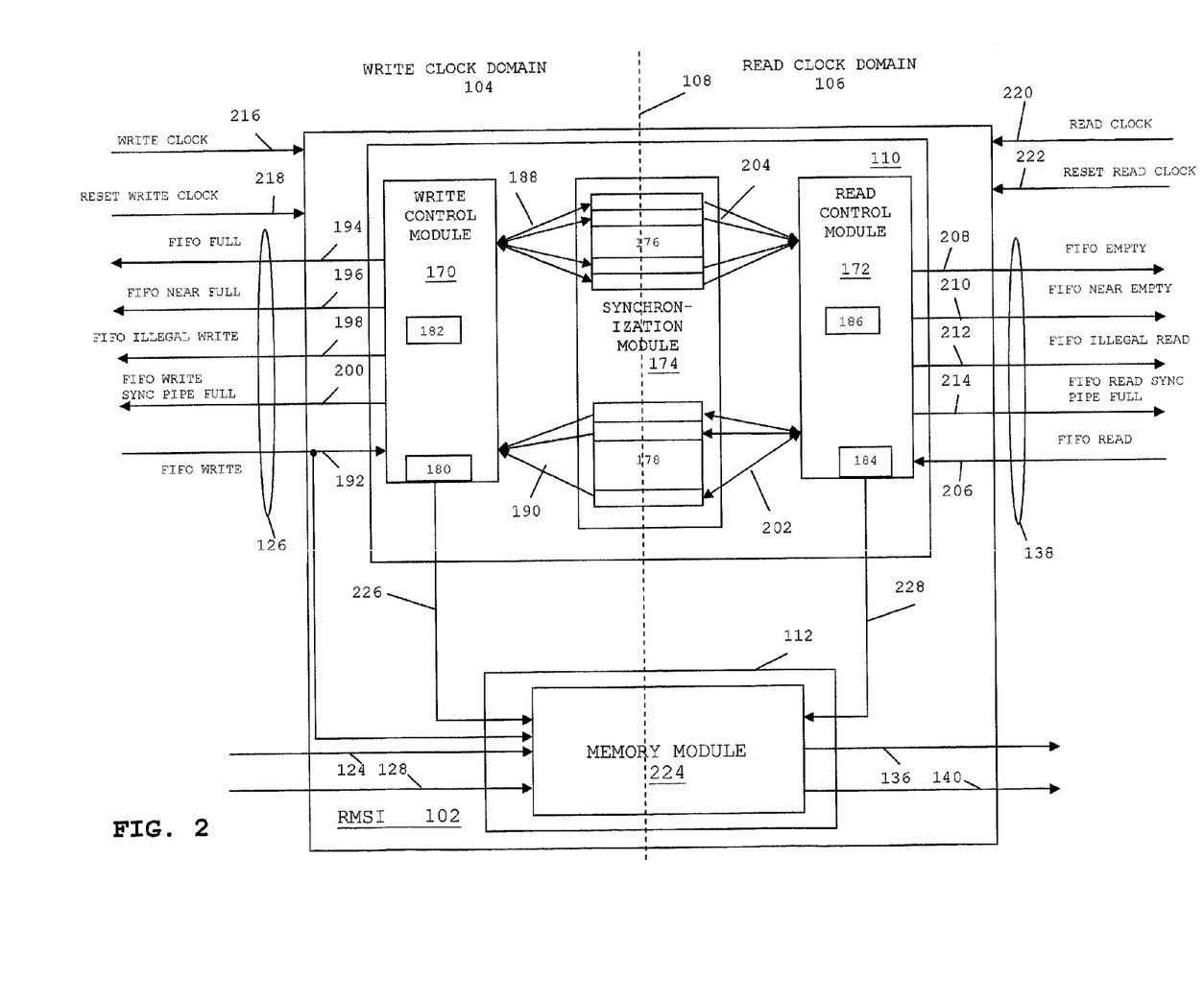
FIG. 2 is a block diagram illustrating an embodiment of a rate matching synchronization interface constructed in accordance with the principles of the invention.

FIG. 2 shows an embodiment of the rate matching synchronization interface 102 of FIG. 1, including the controller 110 and the FIFO memory 112. The controller 110 of the rate matching synchronization interface 102 includes a write control module 170, a read control module 172, and a synchronization module 174 in electrical communication between the write and read control modules 170, 172. The write control module 170 is in the write clock domain 104 and the read control module 172 is in the read clock domain 106.

The synchronization module 174 includes a plurality of write synchronizers 176 and a plurality of read synchronizers 178. As illustrated by the dashed line 108, a first portion of each synchronizer 176, 178 is in the write clock domain 104 under the control of the write clock, and a second portion of each synchronizer 176, 178 is in the read clock domain 106 under the control of the read clock. Accordingly, the designation "write" and "read" for a particular synchronizer corresponds to the clock domain in which that synchronizer receives a request signal, as described in more detail below.

The write control module 170 is in electrical communication with the synchronization module 174 by a plurality of write request signal lines 188 and by a plurality of read request sync to write clock signal lines 190. Each write request signal line 188 is in electrical communication with one of the write synchronizers 176, and each read request sync to write clock signal line 190 is in electrical communication with one of the read synchronizers 178. The number of synchronizers is illustrative; fewer or more write and read synchronizers than those shown can be used without departing from the principles of the invention.

The write control module 170 includes a write pointer 180 and a write register 182. The write pointer 180 is, in one embodiment, a register that contains a value that points to the next memory location in the FIFO memory 112 to which a data item 117 may be written. In one embodiment, the write register 182 stores a count of the number of data items 117 stored in the FIFO memory 112 for the write clock domain 104. In another embodiment, the write register 182 stores a count of the number of free locations in the FIFO memory 112 for storing data items. For either embodiment, the write control module 170 can use the contents of the write register 182 to generate status information for the FIFO memory 112, such as that the FIFO memory 112 is full or almost full.

The write control module 170 is in electrical communication with the write state machine controller 120 (FIG. 1) to exchange signals on signal lines 126. Signal lines 126 include a "FIFO write" input signal 192, a "FIFO full" output signal 194, a "FIFO near-full" output signal 196, a "FIFO illegal write" output signal 198, and a "FIFO write sync pipe full" output signal 200.

The read control module 172 is in electrical communication with synchronization module 174 over a plurality of read request signal lines 202 and over a plurality of write request sync to read clock signal lines 204. Each read request signal line 202 is in electrical communication with one of the read synchronizers 178, and each write request sync to read clock signal line 204 is in electrical communication with one of the write synchronizers 176. (Here and throughout this description, the reference numeral associated with a particular signal line may also be used to identify the particular signal traversing that signal line.)

The read control module 172 is also in electrical communication with the read state machine controller 132 (FIG. 1) to exchange signals on signal lines 138. Signal lines 138 include a "FIFO read" input signal 206, a "FIFO empty" output signal 208, a "FIFO near-empty" output signal 210, a "FIFO illegal read" output signal 212, and a "FIFO read sync pipe full" output signal 214.

The read control module 172 includes a read pointer 184 and a read register 186. In one embodiment, the read pointer 184 is a register that stores a value that points to the next memory location in the FIFO memory 112 from which a data item 117 is to be read. The read register 186 stores a count of the number of data items 117 in the FIFO memory 112 for the read clock domain 106. The read control module 172 uses the contents of the read register 186 to generate status information for the FIFO memory 112, such as empty or near empty. This status information includes the FIFO empty signal 208 or FIFO near empty output signal 210.

The rate matching synchronization interface 102 also receives the following input signals: a "write clock" input signal 216, a "reset write clock" input signal 218, a "read clock" input signal 220, and a "reset read clock" input signal 222, described in more detail below.

Also shown in FIG. 2, the FIFO memory 112 of the rate matching synchronization interface 102 includes a memory module 224. In one embodiment, the memory module 224 includes the protocol control bits memory section 114 and the data memory section 116 of FIG. 1. The memory module 224 can be implemented using asynchronous or synchronous memory.

The memory module 224 is in electrical communication with the write logic module 118 (FIG. 1) over signal line 124 and the write state machine controller 120 (FIG. 1) over signal line 128 to receive the data and control information that make up the data items 117 (FIG. 1). The FIFO write signal 192 passes to the memory module 224 from the write state machine controller 120.

The memory module 224 is also in electrical communication with the write control module 170 to receive the write pointer 180 over signal line 226 and with the read control module 172 to receive the read pointer 184 over signal line 228. The memory module 224 is in communication with the read logic module 130 (FIG. 1) and the read state machine controller 132 (FIG. 1) by signal lines 136, 140 to provide the data items 117 that are read from the memory module 224.

Figure 3A:
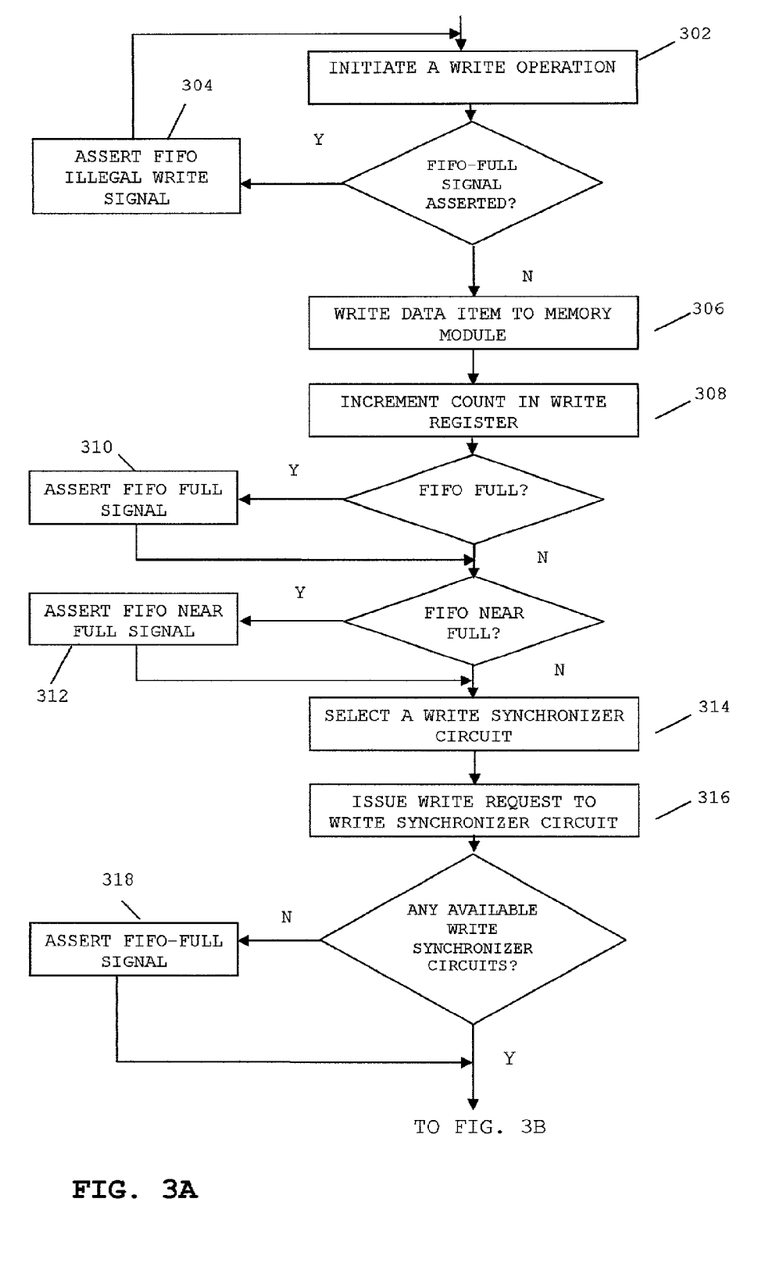
FIG. 3A and FIG. 3B are flow charts illustrating an embodiment of a process of synchronizing a write operation across clock domains.
Figure 3B:
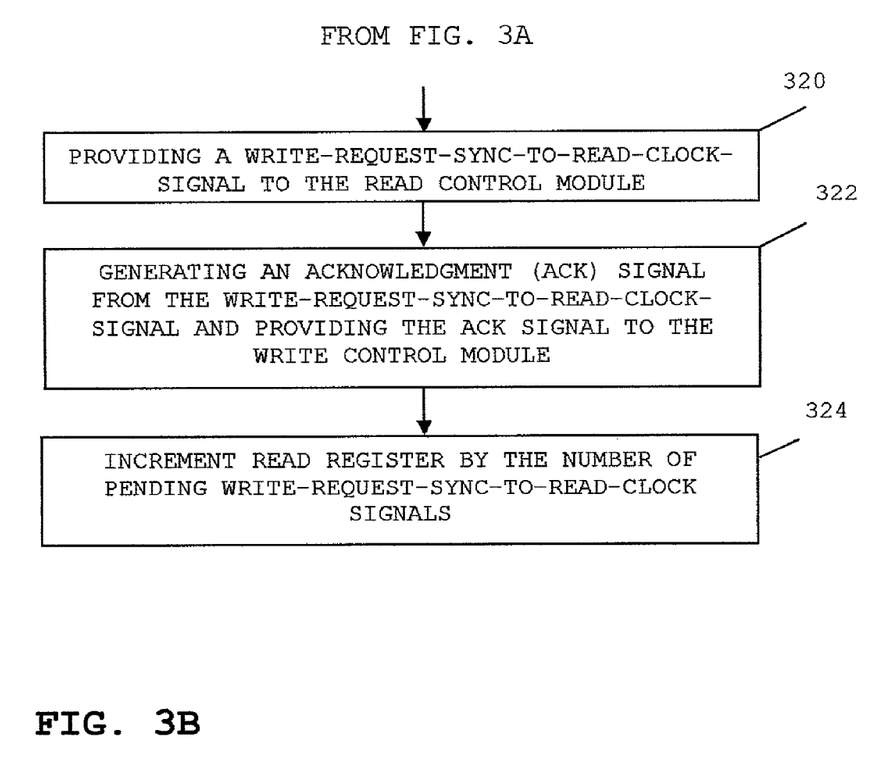

FIG. 3A and FIG. 3B show an embodiment of a process 300 by which the rate matching synchronization system 100 of FIG. 1 synchronizes a write operation across the clock domains 104, 106. In general, the process 300 uses the FIFO full and FIFO near full signals 194, 196, and the FIFO empty and FIFO near empty signals 208, 210 (FIG. 2) to prevent "overrun" and "underrun" conditions when writing to and reading from the FIFO memory 112. An overrun condition occurs when a new data item 117 is being added to an already full FIFO memory 112. The new data item either overwrites a previously written data item that has not yet been read from the FIFO memory 112 or is lost. An underrun condition occurs when a data item is read from a FIFO memory location before a valid data item has been stored into that FIFO memory location.

Referring to FIG. 3A, to write a data item 117 to the memory module 224, the write state machine controller 120 initiates (step 302) the write operation by issuing a FIFO write signal 192 to the write control module 170 and to the memory module 224. If the memory module 224 is full or if there are no available write synchronizers 176, described in more detail below, the FIFO full signal 192 is active. An attempt to write a data item to the memory module 224 while the FIFO full signal 192 is active results in the assertion (step 304) of a FIFO illegal write signal 196. In one embodiment, the data item is written to the memory module 224; in another embodiment, the write operation is rejected and the data item 117 lost.

If the FIFO full signal 192 is not asserted, the write state machine controller 120 causes a data item 117 to be written (step 306) to the memory module 224. The data item 117 includes control information (e.g., protocol control bits) and data associated with the control information. Whereas the memory write occurs immediately, the update of the count in the read domain is delayed by the synchronization logic, as described below.

In one embodiment, the write state machine controller 128 (FIG. 1) forwards the protocol control bits and the write logic module 118 (FIG. 1) forwards the data to the memory module 224. In this embodiment, the write state machine controller 120 writes the control information to the protocol control bits section 114 (FIG. 1) of the memory module 224 over the control line 128. The particular protocol control bits transferred through the rate matching synchronization interface 102 depend upon the particular implementation. For example, in a MAC (media access control) implementation, the protocol control bits include, but are not limited to, "start of packet," "end of packet," and "port number."

The write state machine controller 120 also communicates with the write logic module 118 over control line 122 (FIG. 1) to cause packet data associated with the protocol control bits to be taken from the write logic module 118 and stored in the data memory section 116 of the memory module 224 over the data line 124. In an alternative embodiment, the write state machine controller 120 obtains the packet data from the write logic module 118 and sends the packet data to the data memory 116.

To determine the memory location where the data item is written, the write control module 170 sends a write pointer signal 226 conveying the contents of the write pointer 180 to the memory module 224. The FIFO write signal 192 received by the memory module 224 from the write state machine controller 120 initiates the write operation at that memory location. The write operation is described below in more detail in connection with FIG. 5.

The write control module 170 also increments (step 308) the count in the write register 182 by one. The write control module 170 can then examine the current count in the write register 182 to determine how many, if any, memory locations remain available in the memory module 224 for storing data items 117.

If, after the write operation, the write register 182 indicates that the memory module 224 is full, the write control module 170 asserts (step 310) the FIFO full signal 194. If the memory module 224 is not full, but only a certain number of memory locations in the memory module 224 (e.g., one) remains available for storing a subsequent data item 117, the write control module 170 asserts (step 312) the FIFO near full signal 196 until the count in the write register 182 increases above the certain number described above.

Also, in response to the FIFO write signal 192, the write control module 170 selects (step 314) one of the write synchronizers 176 of the synchronization module 174 and issues (step 316) a write request to that write synchronizer 176 over the corresponding write request signal line 188. This write request is a one-clock cycle pulse in the write clock domain 104. The write control module 170 selects the write synchronizer 176 in round robin fashion while ensuring that the write request does not go to a write synchronizer 176 that has not yet acknowledged a write request previously issued to that write synchronizer 176.

If, after issuing the write request signal 188 to the selected write synchronizer 176, all write synchronizers 176 have a pending unacknowledged write request, the write control module 170 asserts (step 318) the FIFO full signal 194 and the FIFO write sync pipe full signal 200 until a write synchronizer 176 becomes available (i.e., the write control module 170 receives an acknowledgement signal from the write synchronizer 176). The assertion of the FIFO write sync pipe full signal 200 indicates that the reason for asserting the FIFO full signal 194 is the unavailability of a write synchronizer 176.

Referring now to FIG. 3B, the selected write synchronizer 176 responds to the write request 188 by generating (step 320) a write request sync to read clock signal 204, which propagates to the read control module 172. The write request sync to read clock signal 204 received by the read control module 172, in effect, indicates that there is a data item 117 in the memory module 224 to be read and that the count in the write register 182 has increased by one. The write synchronizer 176 then operates as self-handshaking (or self-acknowledging) circuit by generating (step 322) an acknowledgement signal from write request sync to read clock signal 204 and propagating the acknowledgement signal back to the write control module 170 over the signal line 188 by which the write request 188 was received.

If the clock speed in the write clock domain 104 is faster than the clock speed in the read clock domain 106, after synchronization, multiple synchronized write request sync to read clock signals 204 may be active during any one read clock cycle. The read control module 172 increments (step 324) the data item count in the read register 186 by one for each active write request sync to write clock signal 204 received since the last read clock cycle. For example, if the write clock speed is twice the read clock speed, then, on average, the read control module 172 receives two write request sync to read clock signals 204 during each read clock cycle. Accordingly, in this instance the read control module 172 on average increments the count in the read register 186 by two, and, for some read clock cycles, may increment the count by one or by three.

After issuing the write request to the particular write synchronizer 176 over the signal line 188, the write control module 170 does not issue another write request signal to the same particular write synchronizer 176 until the write control module 170 receives the acknowledgment signal from that write synchronizer 176. Receipt of the acknowledgment signal indicates to the write control module 170 that the read control module 172 has received the write request sync to read clock signal 204. Accordingly, that write synchronizer 176 is now eligible to receive another write request from the write control module 170. For the purpose of keeping track of which write synchronizers 176 have pending unacknowledged requests, the write control module 170 can maintain a table, in software or hardware, to indicate the pending status of each write synchronizer 176.

There is latency from when the write control module 170 issues the write request signal 188 and receives the acknowledgment signal. As described in more detail below, this latency can span multiple write and read clock cycles, and is, in effect, a "handshaking penalty." Accordingly, in an embodiment of the synchronization module 174 in which there is only one write synchronizer 176, the handshaking penalty limits the rate at which data transfers can cross from the write clock domain 104 to the read clock domain 106 because the write control module 170 is not permitted to issue another write request signal 188 to the same write synchronizer 176 until a previously issued write request signal 188 has been acknowledged.

To remove the effects of the handshaking penalty, one embodiment of the synchronization module 174 has a plurality of write synchronizers 176. An optimal number of write synchronizers 176 is described in connection with FIG. 6. Each write synchronizer 176 provides a "pipe" through which the write control module 170 can communicate to the read control module 172 that a new data item 117 has been stored in the memory module 224. If one pipe is busy, the write control module 170 can use the next available pipe. The number of pipes is determined so that there is always at least one pipe available to the write control module 170. Consequently, the write control module 170 is able to issue a write request signal 188 as often as once per write clock, if necessary to match the bit rate of the read clock domain 106.

Figure 4A:
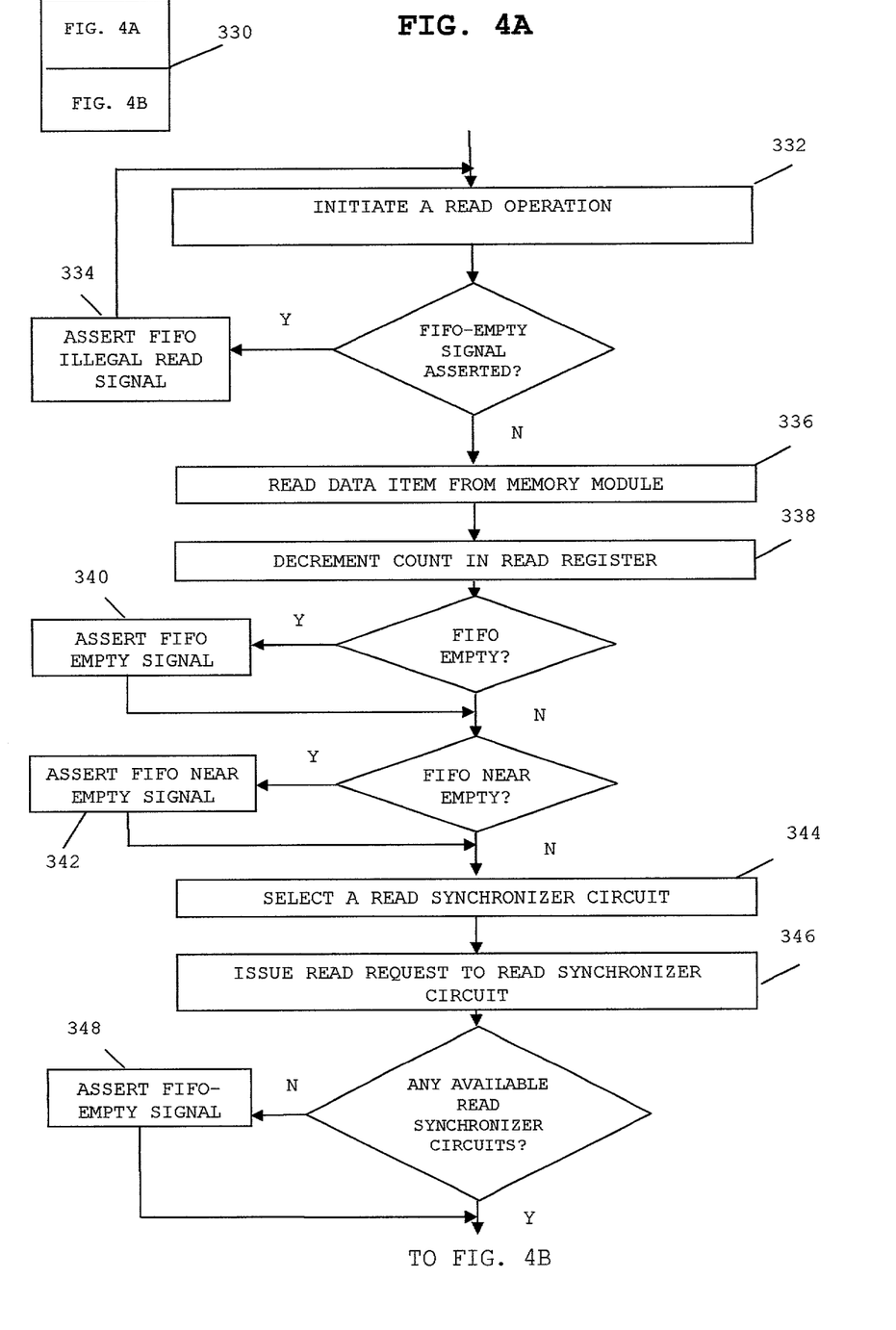
FIG. 4A and FIG. 4B are flow charts illustrating an embodiment of a process of synchronizing a read operation across clock domains.
Figure 4B:
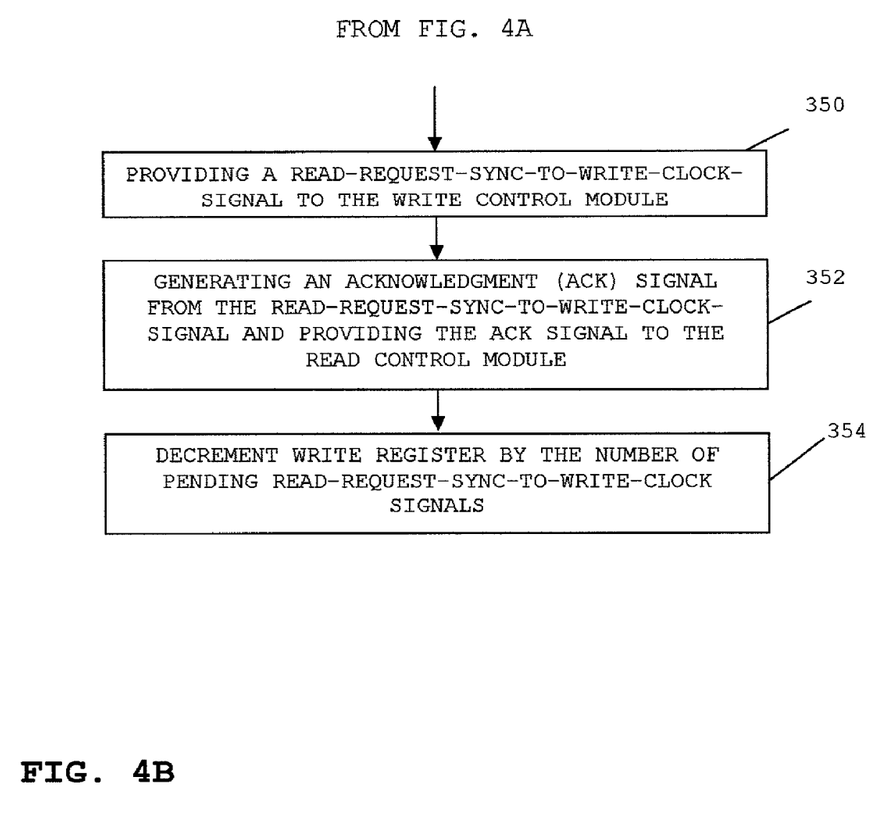

FIG. 4A and FIG. 4B show an embodiment of a process 330 by which the rate matching synchronization system 100 of FIG. 1 synchronizes a read operation across the clock domains 104, 106. Referring to FIG. 4A, to read a data item 117 from the memory module 224, the read state machine controller 132 (FIG. 1) initiates (step 332) a read operation by issuing a FIFO read signal 206 to the read control module 172 (FIG. 2). If the memory module 224 is empty or if there are no available read synchronizers 178, described in more detail below, the FIFO empty signal 208 is asserted. While the FIFO empty signal 208 is asserted, an attempt to read a data item 117 from the memory module 224 results in the assertion (step 334) of a FIFO illegal read signal 212, and the read operation retrieves the same data item previously retrieved.

If the FIFO empty signal 208 is not asserted, the read state machine controller 132 causes a data item 117 to be read (step 336) from the memory module 224. The data item 117 passes from the memory module 224 to read logic module 130 (FIG. 1) and to the read state machine controller 132 over signal lines 136 and 140, respectively. In one embodiment, the read state machine controller 132 receives the control information (e.g., protocol control bits) of the data item 117 and the read logic module 130 receives the packet data associated with the control information. To determine the memory location from which the data item 117 is read, the read control module 172 sends a read pointer 184 to the memory module 224 over signal line 228. The read operation is described below in more detail in connection with FIG. 5.

As a result of the read operation, the read control module 172 decrements (step 338) the count in the read register 186 by one. The read control module 172 can then examine the current count in the read register 186 to determine if there remain any data items 117 in the memory module 224.

If, after the read operation, the read register 186 indicates that the memory module 224 is empty, the read control module 172 asserts (step 340) the FIFO empty signal 208. This FIFO empty signal 208 can be used to avoid underrun. If the memory module 224 is not empty, but has only a certain number of a data items 117 stored in the memory module 224 (e.g., one), the read control module 172 asserts (step 342) the FIFO near empty signal 210 until the count in the read register 186 increases above the certain number.

Also, in response to the FIFO read signal 206, the read control module 172 selects (step 344) one of the read synchronizers 178 of the synchronization module 174 and issues (step 346) a read request to that read synchronizer 178 over the corresponding read request line 202 (FIG. 2). This read request is a one-clock cycle pulse in the read clock domain 106. The read control module 172 selects the read synchronizer 178 in round robin fashion while ensuring that the read request does not go to a read synchronizer 178 that has not yet acknowledged a read request previously issued to that read synchronizer 178.

If after issuing the read request to the selected read synchronizer 178 all read synchronizers 178 have a pending unacknowledged read request, the read control module 172 asserts (step 348) the FIFO empty signal 208 and the FIFO read sync pipe full signal 214 until a read synchronizer 178 becomes available (i.e., the read control module 172 receives an acknowledgement signal from that read synchronizer 178). The assertion of the FIFO read sync pipe full signal 214 identifies the reason for asserting the FIFO empty signal 208 as the unavailability of a read synchronizer 178.

Referring now to FIG. 4B, the selected read synchronizer 178 responds to the read request by generating (step 350) a read request sync to write clock signal 190, which propagates to the write control module 170. The read synchronizer 178 then operates as self-handshaking (or self-acknowledging) circuit by generating (step 352) an acknowledgement signal from read request sync to write clock signal 190 and propagating the acknowledgement signal back to the read control module 172.

After issuing the read request to the particular read synchronizer 178, the read control module 172 does not issue another read request to the same particular read synchronizer 178 until the read control module 172 receives the acknowledgment signal from that read synchronizer 178. Receipt of the acknowledgment signal indicates to the read control module 172 that the write control module 170 has received the read request sync to write clock signal 190. Accordingly, that read synchronizer 178 is now eligible to receive another read request from the read control module 172.

As with a write synchronizer 176, a read synchronizer 178 has a handshaking penalty. Accordingly, in an embodiment of the synchronization module 174 in which there is only one read synchronizer 176, the handshaking penalty limits the rate at which data transfers can cross from the write clock domain 104 to the read clock domain 106 because the read control module 172 is not permitted to issue a read request signal to the read synchronizer 178 until a previously issued read request signal has been acknowledged.

As with the write synchronizers 178, to remove the effects of the handshaking penalty, one embodiment of the synchronization module 174 has a plurality of read synchronizers 178. An optimal number of read synchronizers 178 is described in connection with FIG. 6. Each read synchronizer 178 provides a "pipe" through which the read control module 172 can communicate to the write control module 170 that a data item 117 has been removed from the memory module 224 and that the number of data items 117 in the memory module 224 has decreased by one. If one pipe is busy, the read control module 172 uses the next available pipe. In accordance with the principles of the invention, the number of pipes is determined so that there is always at least one pipe available to the read control module 172. Consequently, the read control module 172 is able to issue a read request signal upon the occurrence of each read clock if necessary to match the bit rate of the write clock domain 104.

If the clock speed in the read clock domain 106 is faster than the clock speed in the write clock domain 104, after synchronization, multiple synchronized read request sync to write clock signals 190 may be active during any one write clock cycle. The write control module 170 decrements (step 354) the data item count in the write register 182 by one for each active read request sync to write clock signal 190 during that write clock cycle.

Figure 5:
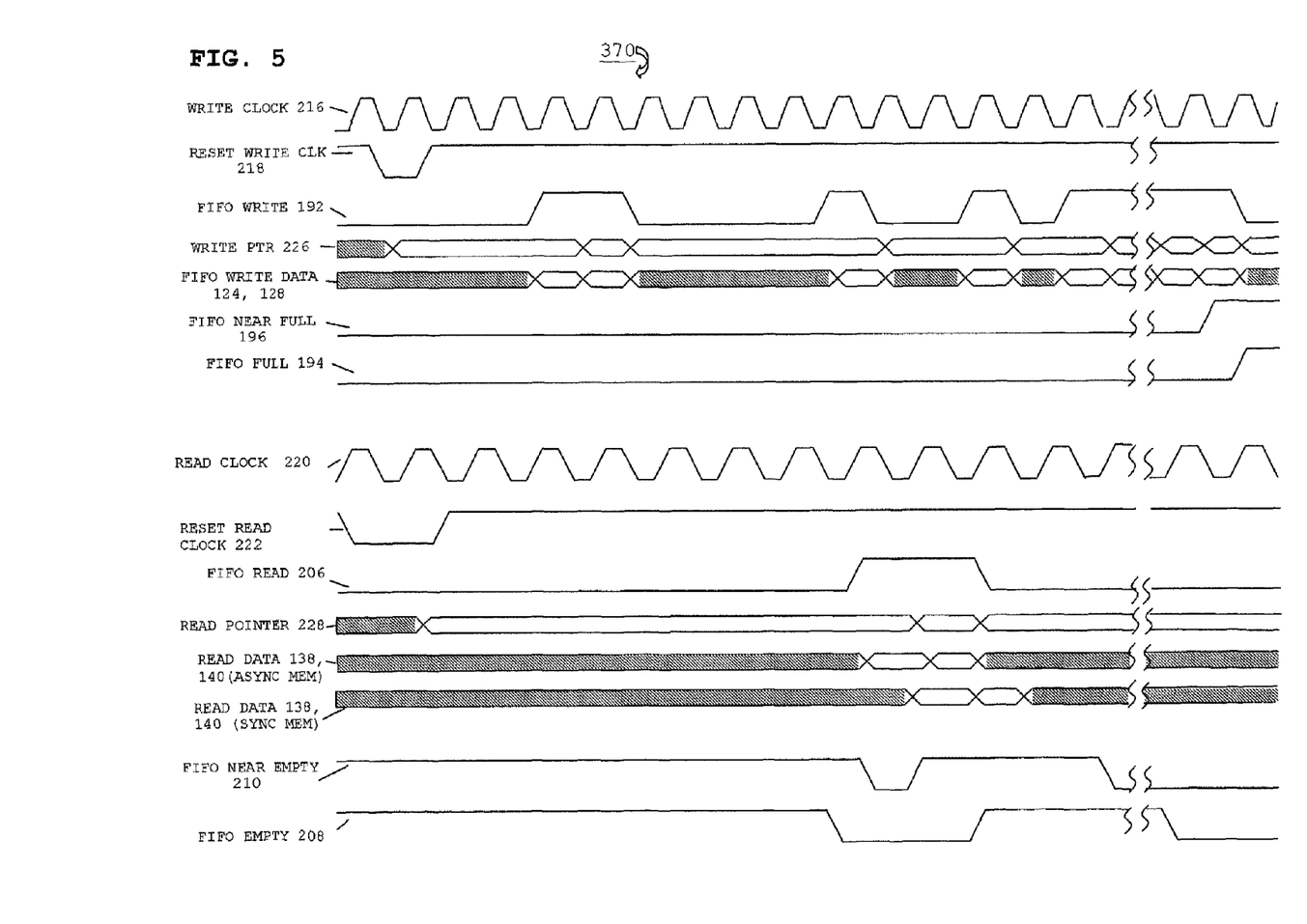
FIG. 5 is a timing diagram illustrating one embodiment of the relationships among timing signals for read and write operations.

FIG. 5 shows a timing diagram 370 illustrating embodiments of read and write operations performed by the controller 110 (FIG. 1). Shown are various timing signals used in the write clock domain 104 to perform write operations, including the FIFO write data signal lines 124, 128, the FIFO write signal 192, the FIFO full signal 194, the FIFO near full signal 196, the write clock signal 216, the reset write clock signal 218, and the write pointer signal 226. These and other timing signals used in the write clock domain 104 are described in Table 1 below.

TABLE 1

| Signal Name | Signal Direction (from controller 110 viewpoint) | Signal Description |
|---|---|---|
| Reset write clock | Input | An active low reset signal for the write clock domain. |
| Write clock | Input | The clock signal to which write operations are synchronous. |
| Fifo write | Input | When asserted, the FIFO write data is written into memory. If the FIFO full signal is active, no memory write occurs. |
| Write pointer | Output | The address pointer for memory writes. |
| Fifo freeitems wrclk | Output | Indicates the number of free items in the memory module as perceived in the write clock domain. |
| Fifo near full | Output | Indicates that the FIFO is almost full. The level of fullness is adjustable per application to handle burst or pipeline operations. |
| Fifo full | Output | Indicates that the FIFO is full and cannot accept any additional writes. A write when the FIFO is full is lost. |
| Fifo illegal write | Output | Indicates that the FIFO write signal was asserted when the FIFO full signal was asserted. The signal can be useful in debug operations. |
| Fifo write sync pipe full | Output | Indicates that the FIFO full signal was asserted because all of the write synchronizers had pending write requests. The signal can be useful in debug operations to indicate that the number of write synchronizers should be increased. |

Upon power-up of the system 100, the reset write clock signal 218 resets the write clock circuit with an active low pulse. The write register 182 and write pointer 180 are set to zero. The write clock signal 216 provides continuous timing signals of a certain frequency. The FIFO write signal 192 initiates a write operation upon an active low signal edge. The FIFO write data signals 124, 128 provide the data to be written (shaded) when the FIFO write signal 192 becomes active and the write pointer 180 provides the address location in the memory module 224 where the data indicated by the FIFO write data signals 124, 128 are written. The FIFO near fill and FIFO fill signals 196, 194, respectively, transition from low-to-high when asserted. Write operations are blocked when the FIFO fill signal 194 is asserted.

Timing signals used in the read clock domain 1016 to perform read operations include the FIFO read data signals 136, 140, the FIFO read signal 206, the FIFO empty signal 208, the FIFO near empty signal 210, the read clock 220, the reset read clock signal 222, and the read pointer signal 228. These and other timing signals used in the read clock domain 106 are described in Table 2 below.

TABLE 2

| Signal Name | Signal Direction (from controller 110 viewpoint) | Signal Description |
|---|---|---|
| Reset read clock | Input | Active low reset signal for the read clock domain. |
| Read clock | Input | The clock signal to which read operations are synchronous. |
| Fifo read | Input | Indicates a read from the FIFO. The FIFO read data is valid one cycle after the assertion of the FIFO read signal. |
| Read pointer | Output | The address pointer for the synchronous memory for reads. |
| Fifo numitems rdclk | Output | Indicates the number of items in the FIFO as perceived from the read clock domain. |
| Fifo near empty | Output | Indicates the FIFO is almost empty. The level is adjustable to handle burst requirements. |
| FIFO empty | Output | Indicates that the FIFO is empty. A read during while the FIFO empty signal is active is illegal and causes the return of the previously read data. |
| Fifo illegal read | Output | Indicates that the FIFO read was asserted while the FIFO empty signal was active. Useful for debugging operations. |
| Fifo read sync pipe full | Output | Indicates that the FIFO empty signal was asserted because all of the read synchronizers had pending requests. This signal can be useful in debug operations to indicate that the number of read synchronizers should be increased. |

Upon power-up of the system 100, the reset read clock signal 222 resets the read clock circuit. At reset, the read register 186 and read pointer 184 are set to zero. The read clock 220 provides continuous timing signals at a certain frequency. The FIFO read signal 206 enables read operations when in the low state. When the FIFO read signal 206 is low, the read pointer signal 228 indicates the memory location from which the data item is read. The timing for when valid FIFO read data is available (shaded) depends upon the type of memory used, e.g., asynchronous and synchronous. For asynchronous memory, valid read data becomes available based on the FIFO read signal 206. For synchronous memory, valid read data becomes available based on the read clock signal 220. In one embodiment, the FIFO near empty and FIFO empty signals 210, 208, respectively, transition from low-to-high when asserted.

Figure 6:
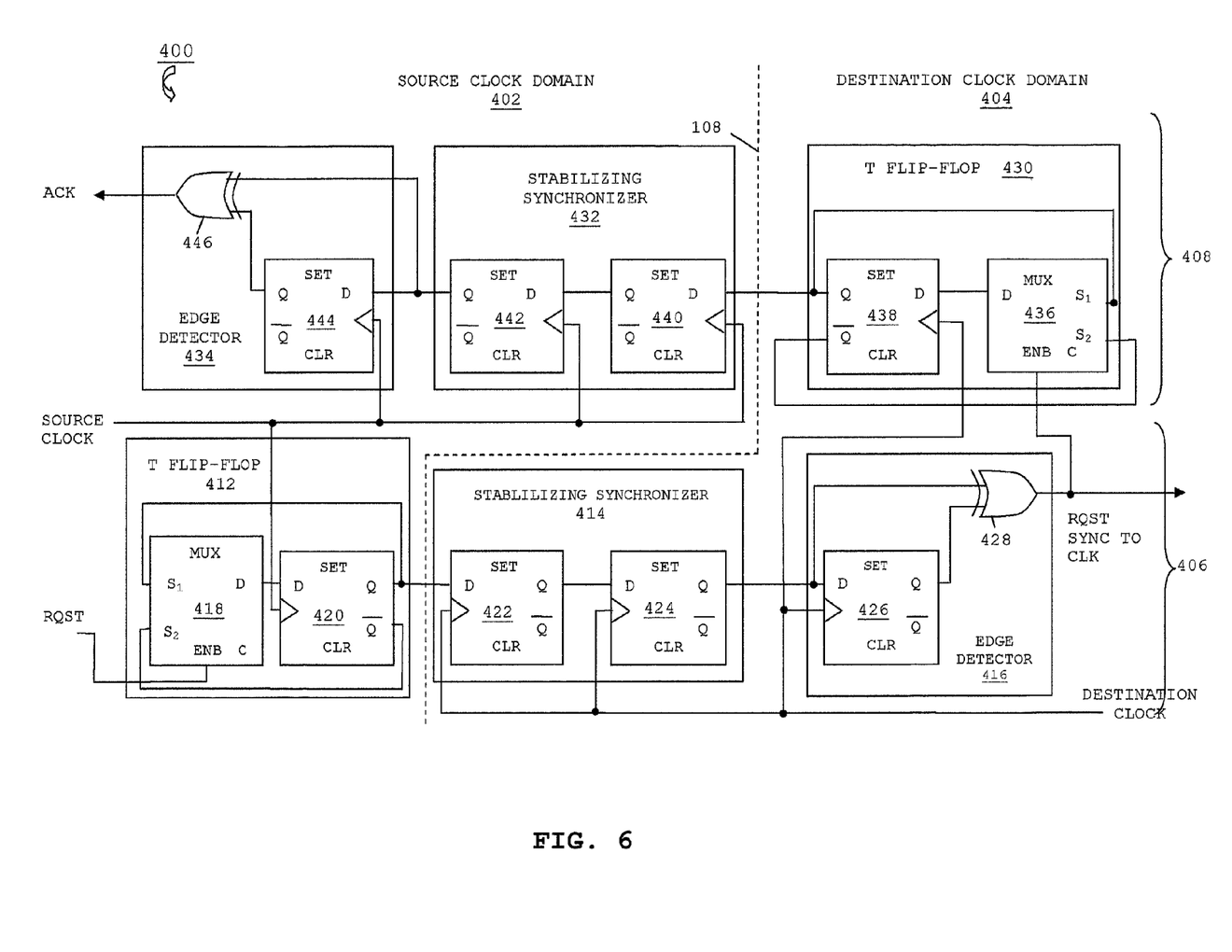
FIG. 6 is a block diagram of an embodiment of a general synchronizer circuit (or synchronizer pipe).

FIG. 6 shows an embodiment of a general synchronizer circuit 400. Each write synchronizer 176 (FIG. 3) and each read synchronizer 178 (FIG. 3) is an embodiment of the general synchronizer circuit 400. The synchronizer circuit 400 includes a pair of pulse converters, a forward pulse converter 406 and a reverse pulse converter 408, which traverse clock domains 402, 404. The dashed line 108 demarcates the boundary between the clock domains 402, 404.

The forward pulse converter 406 includes a T flip-flop 412 (also known as a Toggle flip-flop), a stabilizing synchronizer 414, and an edge detector 416. In one embodiment, the T-flip flop 412 includes a two-to-one multiplexer 418 in electrical communication with a D flip-flop 420. The multiplexer 418 includes an enable input terminal (ENB), a pair of input terminals, S1 and S2, and an output terminal D.

D flip flop 420 includes a D input terminal, a clock input terminal, and a pair of output terminals Q and inverted Q. The D output terminal of the multiplexer 418 is in electrical communication with the D input terminal of the D flip-flop 420. The Q output terminal of the D flip-flop 420 is in electrical communication with the S$_1$ input terminal of the multiplexer 418, and the inverted Q output terminal of the D flip-flop 420 is in electrical communication with the S$_2$ input terminal of the multiplexer 418.

A request pulse (RQST) enters the forward pulse converter 406 at the enable input terminal of the multiplexer 418. A clock signal (source clock) of the source clock domain 402 passes to the clock input terminal of the D flip-flop 420.

The stabilizing synchronizer 414 includes a pair of D flip-flops 422, 424 arranged in series. Each D flip-flop 422, 424 includes a D input terminal, a clock input terminal, and pair of output terminals, Q and inverted Q. The D input terminal of the D flip-flop 422 is in electrical communication with the Q output terminal of the D flip-flop 420 of the T flip-flop 412. The Q output terminal of the D flip-flop 422 is in electrical communication with the D input terminal of the D flip-flop 424. The destination clock signal of the destination clock domain 404 passes to the clock input terminals of the D flip-flop 422 and D flip-flop 424.

The edge detector 416 includes a D flip-flop 426 and an exclusive-or (XOR) gate 428. The D flip-flop 426 includes a D input terminal, a clock input terminal, and pair of output terminals, Q and inverted Q. The XOR gate 428 includes a pair of input terminals and an output terminal. The Q output terminal of the D flip-flop 424 of the stabilizing synchronizer 414 is in electrical communication with the D input terminal of the D flip-flop 426 and with one of the input terminals of the XOR gate 428. The Q output terminal of the D flip-flop 426 is in electrical communication with the other of the input terminals of the XOR gate 428. The clock signal of the destination clock domain 404 passes to the clock input terminal of the D flip-flop 426. The output terminal of the XOR gate 428 provides a request sync to clock (RQST SYNC TO CLK) pulse. The destination clock signal determines the pulse width of the request sync to clock pulse, that is, the pulse width is one clock cycle of the destination clock.

The reverse pulse converter 408 includes a T flip-flop 430, a stabilizing synchronizer 432, and an edge detector 434. The T-flip flop 430 includes a multiplexer 436 in electrical communication with a D flip-flop 438. The multiplexer 436 includes an enable input terminal ENB, a pair of input terminals, S1 and S2, and an output terminal D. D flip flop 438 includes a D input terminal, a clock input terminal, and a pair of output terminals Q and inverted Q. The D output terminal of the multiplexer 436 is in electrical communication with the D input terminal of the D flip-flop 438. The Q output terminal of the D flip-flop 438 is in electrical communication with the S$_1$ input terminal of the multiplexer 436, and the inverted Q output terminal of the D flip-flop 438 is in electrical communication with the S$_2$ input terminal of the multiplexer 436.

The request sync to clock pulse generated by the forward pulse converter 406 enters the reverse pulse converter 408 at the enable input terminal of the multiplexer 436. A clock signal (destination clock) of the destination clock domain 404 passes to the clock input terminal of the D flip-flop 438.

The stabilizing synchronizer 432 includes a pair of D flip-flops 440, 442 arranged in series. Each D flip-flop 440, 442 includes a D input terminal, a clock input terminal, and pair of output terminals, Q and inverted Q. The D input terminal of the D flip-flop 440 is in electrical communication with the Q output terminal of the D flip-flop 438 of the T flip-flop 430. The Q output terminal of the D flip-flop 440 is in electrical communication with the D input terminal of the D flip-flop 442. The source clock signal of the source clock domain 402 passes to the clock input terminals of the D flip-flop 440 and the D flip-flop 442.

The edge detector 434 includes a D flip-flop 444 and an exclusive-or (XOR) gate 446. The D flip-flop 444 includes a D input terminal, a clock input terminal, and pair of output terminals, Q and inverted Q. The XOR gate 446 includes a pair of input terminals and an output terminal. The Q output terminal of the D flip-flop 442 of the stabilizing synchronizer 432 is in electrical communication with the D input terminal of the D flip-flop 444 and with one of the input terminals of the XOR gate 446. The Q output terminal of the D flip-flop 444 is in electrical communication with the other of the input terminals of the XOR gate 446. The source clock signal of the source clock domain 402 passes to the clock input terminal of the D flip-flop 444. The output terminal of the XOR gate 446 provides an acknowledgment (ACK) pulse. The source clock signal determines the pulse width of the ACK pulse (i.e., one cycle of the source clock).

When the synchronizer circuit 400 applies to a write synchronizer 176, the source clock domain 402 is the write clock domain 104 and the destination clock domain 404 is the read clock domain 106. Accordingly, the source clock signal is the write clock, and the destination clock signal is the read clock. The RQST pulse received by the forward pulse converter 406 is a write request signal 188 provided by the write control module 170, and the request sync to clock pulse generated by the forward pulse converter 406 is a write request sync to read clock pulse 204. Also, the ACK signal produced by the reverse pulse converter 408 from the write request sync to read clock pulse 204 is a write ACK signal.

When the synchronizer circuit 400 applies to a read synchronizer 178, source clock domain 402 is the read clock domain 106, the destination clock domain 404 is the write clock domain 104, the source clock signal is the read clock signal and the destination clock signal is the write clock signal. The RQST pulse received by the forward pulse converter 406 is a read request signal provided by the read control module 172, and the request sync to clock pulse generated by the forward pulse converter 406 is a read request sync to write clock pulse. Also, the ACK signal produced by the reverse pulse converter 408 from the read request sync to write clock pulse is a read ACK signal.

In operation, the synchronization circuit 400 generally provides a pipe by which circuitry in one clock domain notifies circuitry in another clock domain that a data item has been added or removed from the memory module 224, and self-acknowledges the notification. The synchronization circuit 400 converts a request pulse received in the source clock domain 402 into a "request sync to clock" pulse in the destination clock domain 404, independent of the clock frequencies of the clock domains 402, 404.

This request sync to clock pulse passes to the circuitry (i.e., a control module 170 or 172) in the destination clock domain 404. The synchronization circuit 400 then converts the request sync to clock pulse in the destination clock domain 404 into an acknowledgment pulse in the source clock domain 402, also independent of the clock frequencies of the clock domains 402, 404. This acknowledgment pulse passes to circuitry in the control module that originated the request pulse.

In general, in order to synchronize a request signal across the clock domains, that signal should remain stable. For the forward and reverse converters 406, 408, the respective T flip-flop 412, 430 converts a pulse into a stable (voltage level) signal, the respective stabilizing synchronizer 414, 432 synchronizes the stable signal with two flip-flops, and the edge detector 416, 434 converts the level signal back into a pulse.

More specifically, the T flip-flop 412 of the forward pulse converter 406 receives a RQST pulse in the source clock domain 404. The RQST pulse passes to the enable input terminal of the multiplexer 418. The T flip-flop 412 toggles state synchronously for each value "1" on the enable (ENB) input to the multiplexer 418. When a value "1" appears on the enable input, the multiplexer 418 selects the inverted Q output of the D flip-flop 420. A value "0" on the enable input causes the T flip-flop 412 to hold its value. The output produced by the T flip-flop 412 is a level signal which passes to the stabilizing synchronizer 414.

From the Q output terminal of the D flip-flop 420, the level signal passes to the D input terminal of the first D flip-flop 422 of the stabilizing synchronizer 414. Upon the occurrence of a destination clock signal in the destination clock domain 404, the first D flip-flop 422 of the stabilizing synchronizer 414 provides the level signal onto its Q output terminal.

The output state at the Q output terminal may be unstable (i.e., in a metastable state). The second D flip-flop 422 of the stabilizing synchronizer 414 provides additional latency during which the metastable events in the first D flip-flop 422 can be resolved. The level signal passes from the D input terminal of the D flip-flop 420 to the D input terminal of the D flip-flop 426 of the edge detector 416 and to one of the input terminals of the XOR gate 428.

Until the occurrence of another destination clock signal, the state of the D input terminal differs from the state of the Q output terminal of the D flip-flop 426. Consequently, the output terminal of the XOR gate 428 transitions from a low to a high state. When that destination clock signal occurs, the state of the D input terminal becomes the same as the state of the Q output terminal of the D flip-flop 426. Thus, the XOR gate 428 transitions back to a low state, creating a pulse (called the request sync to clock pulse) having a pulse width of one clock cycle of the destination clock. Thus, the forward pulse converter 406 converts the request pulse into a request sync to clock pulse in two source clock cycles and two destination clock cycles (i.e., the request pulse occurs in source clock cycle 1, the toggle flop occurs in source clock cycle 2, the synchronizer occurs in destination clock cycles 1 and 2).

This request sync to clock pulse passes to the enable input terminal of the multiplexer 436 of the T flip-flop 430. The reverse pulse converter 408 converts the request sync to clock pulse into an ACK pulse in a similar manner to the conversion of the RQST pulse into the request sync to clock pulse by the forward pulse converter 406. The pulse width of the ACK pulse is one clock cycle of the source clock. Generating the ACK pulse from the request sync to clock pulse occurs in two clock cycles of the destination clock and two clock cycles of the source clock.

To eliminate the effects of the handshaking penalty, the synchronization module 174 employs a plurality of write and read synchronization pipes 176, 178. The number of write synchronization pipes 176 and number of read synchronization pipes 178 depend on the frequencies of the write and read clocks and the rate of write and read operations. This number of write synchronization pipes 176 permits continuous write operations to the memory module 224 without interruption (given the memory module 224 was of infinite depth). The number of read synchronization pipes 178 permits continuous read operations of the memory module 224 without interruption. In embodiments having fewer than this number of write synchronization pipes 176 or fewer than this number of read synchronization pipes 178, the memory module 224 may appear full or empty because of the lack of available synchronization pipes.

The following equation can be used to determine the number of write synchronization pipes 176:

Num of wr req syncs=ceiling$\{N_{wr}*(4*f_{rd\_clk} +3*f_{wr\_clk})/f_{rd\_clk}\}$ (Eq. 1)

where $f_{rd\_clk}$ is the frequency of the read clock, $f_{wr\_clk}$ is the frequency of the write clock, and $N_{wr}$ is the number of writes per clock (i.e., equals 1 for one write operation every clock cycle, or ½ for one write operation for every other clock cycle). $N_{wr}$ denotes the maximum number of writes per clock, not the average writes per clock. If back-to-back writes are required (i.e., so that the write bit rate matches the read bit rate), $N_{wr}$ can be 1. If the fastest write rate is every other clock, $N_{wr}$ can be reduced to ½ to limit the number of write synchronization pipes 176.

The following equation can be used to determine the number of read synchronization pipes 178:

Num of rd req syncs=ceiling$\{N_{rd}*(4*f_{wr\_clk} +3*f_{rd\_clk})/f_{wr\_clk}\}$ (Eq. 2)

where $f_{rd\_clk}$ is the frequency of the read clock, $f_{wr\_clk}$ is the frequency of the write clock, and $N_{rd}$ is the number of reads per clock (i.e., equals 1 for one read operation every clock cycle, or ½ for one read operation for every other clock cycle). $N_{rd}$ denotes the maximum number of reads per clock, not the average reads per clock. If back-to-back reads are required (i.e., so that the read bit rate matches the write bit rate), $N_{rd}$ can be 1. If the fastest read rate is every other clock, $N_{rd}$ can be reduced to ½ to limit the number of read synchronization pipes 178.

The following example illustrates the use of the previous equations. Consider a write clock frequency ($f_{wr\_clk}$) of 200 MHz and read clock frequency ($f_{rd\_clk}$) of 100 MHz. Assume that the required read bandwidth is 200 Mbytes per second. Because the read bandwidth is twice the read clock frequency, the minimum width of the data path of the memory module 224 is 2 bytes if a read operation is performed on every read clock (100 M cycles/sec*2 bytes/cycle=200 Mbytes/sec). Thus, $N_{rd}$ is 1. Because $f_{wr\_clk}$ is 200 MHz and the data path is 2 bytes, $N_{wr}$ is ½ to match the write bit rate to the read bit rate (in this example, 200 Mbytes/sec).

Substituting these values into the above equations (Eq. 1 and Eq. 2) yields the following results:

Num of wr req syncs=½*{(4*100+3*200)/100}=5

Num of rd req syncs=1*{(4*200+3*100)/200}=5.5 (round up to 6 pipes)

Thus, in this example, the synchronization module 174 has five write synchronizers 176 and six read synchronizers 178.

To maintain the desired bandwidth that achieves uninterrupted writes, the memory module 224 has a minimum depth governed by the latency through the rate matching synchronization interface 102. This latency is the roundtrip delay of a write and a read multiplied by the rate of writing. The roundtrip pipeline includes five registers in the write clock domain 104 and five registers in the read clock domain 106. An equation that can be used to determine the minimum depth of the memory module 224 is:

Fifo depth=ceiling$\{N_{wr}*(5*f_{wr\_clk}+5*f_{rd\_clk})/f_{rd\_clk}\}$ where $f_{rd\_clk}$ is the frequency of the read clock, $f_{wr\_clk}$ is the Frequency of the write clock, and $N_{wr}$ is the number of writes per clock (i.e., equals 1 for one write operation every clock cycle, or ½ for one write operation for every other clock cycle).

Using the values from the previous example, the minimum depth is:

Fifo depth=½*{(5*200+5*100)/100}=7.5(rounded to 8).

Thus, the memory module 224, in this example, can store eight data items, each having a two byte width.

These and other configurable parameters for the controller 110 are described below in Table 3.

TABLE 3

| Parameter | Data Type | Min/Max | Default | Description |
|---|---|---|---|---|
| Fifo depth | Integer | 1/— | 128 | Identifies the number of words in the FIFO. In one embodiment, the value matches the depth of the memory module. |
| Pointer width | Integer | 1/12 | 7 | The number of bits required for read and write pointers. This value represents ceiling{log2 fifo_depth}. |
| Fifo near empty | Integer | 0/FIFO depth | 1 | Specifies the level at which the FIFO near empty signal is asserted. |
| Fifo near full | Integer | 0/FIFO depth | 127 | Specifies the level at which the FIFO near full signal is asserted. |
| Num of wr req syncs | Integer | 1/63 | 8 | Specifies the number of write synchronizers. |
| Num of rd syncs | Integer | 1/63 | 8 | Specifies the number of read synchronizers. |
| Sync width | Integer | 1/8 | 3 | Indicates the number of bits for representing the number of synchronizers. It is equal to the greater of [log$_2$(num of rd req syncs] or [log$_2$(num of wr req syncs)]. The value is less than or equal to the pointer width. |

While the invention has been shown and described with reference to specific preferred embodiments, it should be understood by those skilled in the art that various changes in form and detail may be made therein without departing from the spirit and scope of the invention as defined by the following claims.

What is claimed is:

1. A controller for synchronizing transfers of data items stored in memory across clock domains, the controller comprising:
   a first control module in a first clock domain;
   a second control module in a second clock domain;
   a plurality of synchronizers, each synchronizer being in electrical communication with the first and second control modules, each synchronizer having circuitry to provide a synchronization signal to the second control module in response to a request signal received from the first control module, to generate an acknowledgment signal from the synchronization signal, and to provide the acknowledgment signal to the first control module,
   wherein the first control module maintains a record for each synchronizer indicating whether that synchronizer is presently ineligible to receive a request signal from the first control module, the first control module deeming a given synchronizer to be ineligible if the first control module has yet to receive an acknowledgment signal from that synchronizer for a request signal previously sent by the first control module to that synchronizer, the first control module selecting an eligible synchronizer when the first control module issues the request signal.

2. The controller of claim 1, wherein the circuitry of each synchronizer comprises:
   a first pulse converter receiving a request signal in the first clock domain from the first control module and converting the request signal into a synchronization signal in the second clock domain; and
   a second pulse converter in electrical communication with the first pulse converter to receive the synchronization signal in the second clock domain from the first pulse converter and to convert the synchronization signal into an acknowledgment signal in the first clock domain.

3. The controller of claim 1 further comprising a register in each clock domain, each register maintaining a count of a number of data items stored in a memory.

4. The controller of claim 1 wherein one of the first and second clock domains is a write clock domain and the other of the first and second clock domains is a read clock domain.

5. The controller of claim 1 wherein each control module includes a register for maintaining a count of a number of data items stored in the memory.

6. The controller of claim 1, wherein the first control module selects the eligible synchronizer from a plurality of eligible synchronizers in a round robin fashion.

7. The controller of claim 1, wherein the first control module is a write control module, the second control module is a read control module, and the synchronizers are write synchronizers, and further comprising:
   a plurality of read synchronizers, each read synchronizer being in electrical communication with the write and read control modules, each read synchronizer having circuitry to provide a synchronization signal to the write control module in response to a request signal received from the read control module, to generate an acknowledgment signal from this synchronization signal, and to provide this acknowledgment signal to the read control module.

8. The controller of claim 7, wherein a number of write synchronizers and a number of read synchronizers are determined such that at least one of the write synchronizers is eligible to receive a request signal from the write control module and at least one of the read synchronizers is eligible to receive a request signal from the read control module throughout operation of the controller.

9. The controller of claim 8, wherein the first clock domain has a different clock frequency from the second clock domain, and the number of write synchronizers and the number of read synchronizers enable data items to be written continuously to the memory and read continuously from the memory such that an average bit rate of data written to the memory matches an average bit rate of data read from the memory.

10. A method of synchronizing data transfers between a source clock domain and a destination clock domain, the method comprising:
   changing a number of data items stored in memory;
   issuing a first request signal by a control module to indicate the change in the number of data items stored by the memory;
   propagating, by a first synchronizer, the first request signal received from the control module in the source clock domain to the destination clock domain;
   converting, by the first synchronizer, the first request signal issued to the destination clock domain into an acknowledgment signal;
   propagating, by the first synchronizer, the acknowledgment signal to the control module in the source clock domain to indicate that the destination clock domain received the first request signal; and
   selecting a second synchronizer for propagating a second request signal from the source clock domain to the destination clock domain if the control module has yet to receive the acknowledgment signal in response to the first request signal when the control module issues the second request signal.

11. The method of claim 10 further comprising maintaining in each clock domain a count of the number of data items stored in the memory.

12. The method of claim 11 further comprising updating in the destination clock domain the count of the number of data items stored in memory in response to receiving the first request signal.

13. The method of claim 10 wherein the source clock domain operates at a different clock frequency than the destination clock domain.

14. The method of claim 10 further comprising reading in one of the source and destination clock domains a data item from the memory and writing in the other of the source and destination clock domains a data item to the memory.

15. The method of claim 10, further comprising the steps of:
   maintaining a record for each synchronizer indicating whether that synchronizer is presently ineligible to receive a request signal from the control module, the control module deeming a given synchronizer to be ineligible if the control module has yet to receive an acknowledgment signal from that synchronizer for a request signal previously sent by the control module to that synchronizer; and
   wherein the step of selecting the second synchronizer includes selecting, by the control module, an eligible synchronizer when the control module issues the second request signal.

16. The method of claim 15, wherein the step of selecting the eligible synchronizer includes selecting the eligible synchronizer in a round robin fashion from a plurality of eligible synchronizers.

17. The method of claim 15, wherein the control module is a write control module, a second control module is a read control module, and the plurality of synchronizers include write synchronizers and read synchronizers, and further comprising the steps of:
   determining a number of write synchronizers and a number of read synchronizers such that at least one of the write synchronizers is eligible to receive a request signal from the write control module and at least one of the read synchronizers is eligible to receive a request signal from the read control module at any time during operation.

18. The method of claim 17, wherein the source clock domain operates at a different clock frequency from the destination clock domain, and the number of write synchronizers and the number of read synchronizers enable data items to be written continuously to the memory and read continuously from the memory such that an average bit rate of data written to the memory matches an average bit rate of data read from the memory.

19. A controller for synchronizing transfers of data items stored in memory across clock domains, the controller comprising:
- a write control module in a first clock domain;
- a read control module in a second clock domain;
- a plurality of write synchronizers, each write synchronizer being in electrical communication with the write and read control modules, each write synchronizer having circuitry to provide a synchronization signal to the read control module in response to a request signal received from the write control module, to generate an acknowledgment signal from the synchronization signal, and to provide the acknowledgment signal to the write control module; and
- a plurality of read synchronizers, each read synchronizer being in electrical communication with the write and read control modules, each read synchronizer having circuitry to provide a synchronization signal to the write control module in response to a request signal received from the read control module, to generate an acknowledgment signal from this synchronization signal, and to provide this acknowledgment signal to the read control module.

20. The controller of claim 19, wherein the first clock domain has a different clock frequency from the second clock domain, and a particular number of write synchronizers and a particular number of read synchronizers are provided to enable data items to be written continuously to the memory and read continuously from the memory such that an average bit rate of data written to the memory matches an average bit rate of data read from the memory.

* * * * *